(12) United States Patent
Kalass et al.

(10) Patent No.: US 8,269,573 B2
(45) Date of Patent: Sep. 18, 2012

(54) CABLE STRAND FOR ACTIVATING EJECTION VALVES

(75) Inventors: Rainer Kalass, Rohr (DE); Ulrich Harres, Nürnberg (DE)

(73) Assignee: MAN Truck & Bus AG

(*) Notice: Subject to any disclaimer, the term of this patent is extended or adjusted under 35 U.S.C. 154(b) by 1577 days.

(21) Appl. No.: 11/689,677

(22) Filed: Mar. 22, 2007

(65) Prior Publication Data

US 2007/0236309 A1    Oct. 11, 2007

(30) Foreign Application Priority Data

Mar. 24, 2006  (DE) .......................... 10 2006 013 543

(51) Int. Cl.
*H04B 3/32* (2006.01)
(52) U.S. Cl. .......................................... 333/12; 333/100
(58) Field of Classification Search .............. 333/1, 100, 333/12, 104, 105, 181
See application file for complete search history.

(56) References Cited

U.S. PATENT DOCUMENTS

| | | | |
|---|---|---|---|
| 4,222,352 A | | 9/1980 | Drews et al. |
| 4,781,624 A | * | 11/1988 | Shepherd .................... 439/620.1 |
| 4,816,614 A | * | 3/1989 | Baigrie et al. .................. 174/36 |
| 5,086,743 A | | 2/1992 | Hickey |
| 6,259,027 B1 | | 7/2001 | Watanabe |
| 6,867,362 B2 | * | 3/2005 | Cherniski et al. ............... 174/36 |
| 7,289,006 B2 | * | 10/2007 | Gilliland ........................ 333/12 |

FOREIGN PATENT DOCUMENTS

| | | |
|---|---|---|
| DE | 33 36 624 | 4/1985 |
| DE | 196 29 688 | 1/1998 |
| DE | 100 19 410 | 10/2001 |
| EP | 1 111 360 | 6/2001 |
| JP | 61275570 | 12/1986 |
| JP | 7282907 | 10/1995 |
| JP | 8330759 | 12/1996 |

* cited by examiner

*Primary Examiner* — Dean O Takaoka
*Assistant Examiner* — Alan Wong
(74) *Attorney, Agent, or Firm* — Robert W. Becker; Robert Becker & Associates (57) ABSTRACT

A cable strand for the activation of electrically actuatable injection valves of internal combustion engines having a common-rail injection system, wherein the cable strand connects an engine control device with the injection valves. Electrical cables of the cable strand are molded and/or foamed in a carrier that largely prescribes the shape of the cable strand. At least one filter is also molded and/or foamed in the cable strand and is adapted to affect the electromagnetic compatibility of the cable strand arrangement.

12 Claims, 5 Drawing Sheets

CABLE STRAND FOR ACTIVATING EJECTION VALVES

The instant application should be granted the priority date of Mar. 24, 2006, the filing date of the corresponding German patent application 10 2006 013 543.1

BACKGROUND OF THE INVENTION

The present application relates to a cable strand for the activation of electrically actuatable injection valves of internal combustion engines having a common-rail injection system, wherein the cable strand connects an engine control device with the injection valves, and wherein electrical cables of the cable strand are molded and/or foamed in a carrier that to a large extent prescribes the shape of the cable strand.

With modern self-ignition or compression ignition internal combustion engines, especially those used in commercial vehicles, increasingly fuel injection systems of the common-rail type are used. The advantage of such systems is that the pressurization is entirely decoupled from the injection process, as a result of which a plurality of partial injections can take place in a single injection cycle. To realize such partial injections, the electrically actuated injection valves that are disposed on the cylinder head must be activated several times in an injection cycle. In this connection, the activation is effected by means of an engine control system that, spaced from the injection valves, is disposed on the engine or in the engine compartment. For the connection of engine control unit and injection valves, a cable strand is used that, over a wide temperature range, must be provided with a lasting resistance to a variety of media, such as water, dirty water, salt water, water from high-pressure cleaners, cleaning fluid, fats, oils, fuels and the like. The lasting resistance is achieved in a known manner by encasing the conductor and plug connections with a correspondingly media-resistant polymeric material, or in the case of the plug connections with a media-resistant housing.

Due to the short switching or actuation cycles, with their steep signal amplitudes, and the considerable actuation currents that occur with common-rail injection systems, high-frequency actuation peaks result that, as interference radiation, are irradiated from the line connections between the engine control system and the injection valves. When such internal combustion engines are used in areas having increased requirements for a minimized interference radiation, additional measures are necessary in order to reduce this interference radiation to an acceptable level.

Two ways are customarily used to reduce interference radiation. One way provides for shielding the cable connections, thereby blocking the interference radiations the other way comprises providing the outputs of the engine control system with appropriate passive filter circuits that prevent the corresponding actuation peaks from passing to the cable connections.

Both possibilities have considerable drawbacks for use in commercial vehicles, especially those that are produced only in a small scale series for special applications. Where the cable strand is shielded, the entire cable strand, from the engine control system to the injection valves, must be provided with a metallic shielding. For this purpose, due to the aforementioned necessary lasting resistance against a number of media, the metallic shielding must be disposed below the casing of the cable strand that provides the lasting resistance. In addition, the shielding must be connected to the ground of the engine control system, at least at the ends of the cable strand. It will be readily appreciated that such an expensive modification of the cable strand for a small scale production is precluded as unacceptable for cost reasons.

A modification of the engine control system would also require considerable expense, assuming these measures would even be possible due to technical conditions, such as available space in the housing of the engine control system, the development of heat etc.

Proceeding from this situation, it is an object of the present application to realize a straightforward and hence economical possibility for eliminating the undesired interference radiation.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The cable strand of the present application is characterized by at least one filter that is also molded and/or foamed in the cable strand, wherein the filter is adapted to affect the electromagnetic compatibility of the cable strand arrangement By integrating a filter arrangement in the cable strand to minimize the electromagnetic interference radiation, whereby the filter arrangement affects the electromagnetic compatibility and is molded or foamed in the cable strand, the expenditure for improving the electromagnetic compatibility is in an advantageous manner limited to a minimum.

A further advantage is achieved if a filter is provided for each feed line to an injection valve, with a plurality of filters being disposed on a common filter support. In this connection, the common filter support can have at least one region that is electrically connected with at least one ground of each filter disposed on the filter support.

For the mounting of cable strand and filter, it is advantageous to provide a mounting arrangement on the filter support by means of which the filter support and via the latter the cable strand can be mounted directly or indirectly on the internal combustion engine or on the engine control device. In this connection the mounting arrangement can advantageously be electrically conductive, and can be electrically conductively connected with the filter support, so that the filter support, and via the latter the ground connection of the filter, can be connected to the ground or the engine control device without additional expenditure. The mounting device can be embodied as at least one through-sleeve or strap that can respectively be mounted via a through screw directly or indirectly to the internal combustion engine or the engine control device.

To achieve a resistance of the cable strand to media that is as free of gaps as possible, it is advantageous to provide the filters and filter supports with an electrically insulating media-resistant sheathing prior to the molding or foaming It is also advantageous to mold or foam the filter support, with the components disposed thereon, with a sealing compound or filler so that the components are supported relative to one another and relative to the filter support in a low-vibration manner. As a result, failure of, for example, component connections that is induced by vibrations is prevented. To protect against mechanical influences, the filter support, together with the cable strand, are foamed or molded in a mechanically configuration-giving manner, for example with polymeric material, whereby the thus-produced envelope advantageously ensures the mechanical protection in the manner of a housing or casing.

To produce the necessary ground connection between the filter circuits on the filter support and on the engine control device, it is advantageous to dispose the filter support in the immediate vicinity of the engine control device, or ideally on the housing of the engine control device.

A further improvement of the electromagnetic compatibility of the arrangement is advantageously achieved by disposing the components of the filter circuits on the filter support in a manner that minimizes the electromagnetic coupling between them. It is also advantageous if the lines that lead to the filter support, and the lines that lead away from the filter support, are not disposed next to one another, and furthermore to embody the lines leading to the filter support, as well as the lines leading away from the filter support as twisted pairs of lines, whereby the direction of twist and the number of twists of the pairs of lines leading to the filter support and of the pairs of lines leading away from the filter support are different from one another.

Further specific features of the present application will be described in detail subsequently.

DESCRIPTION OF SPECIFIC EMBODIMENTS

Figure 1:
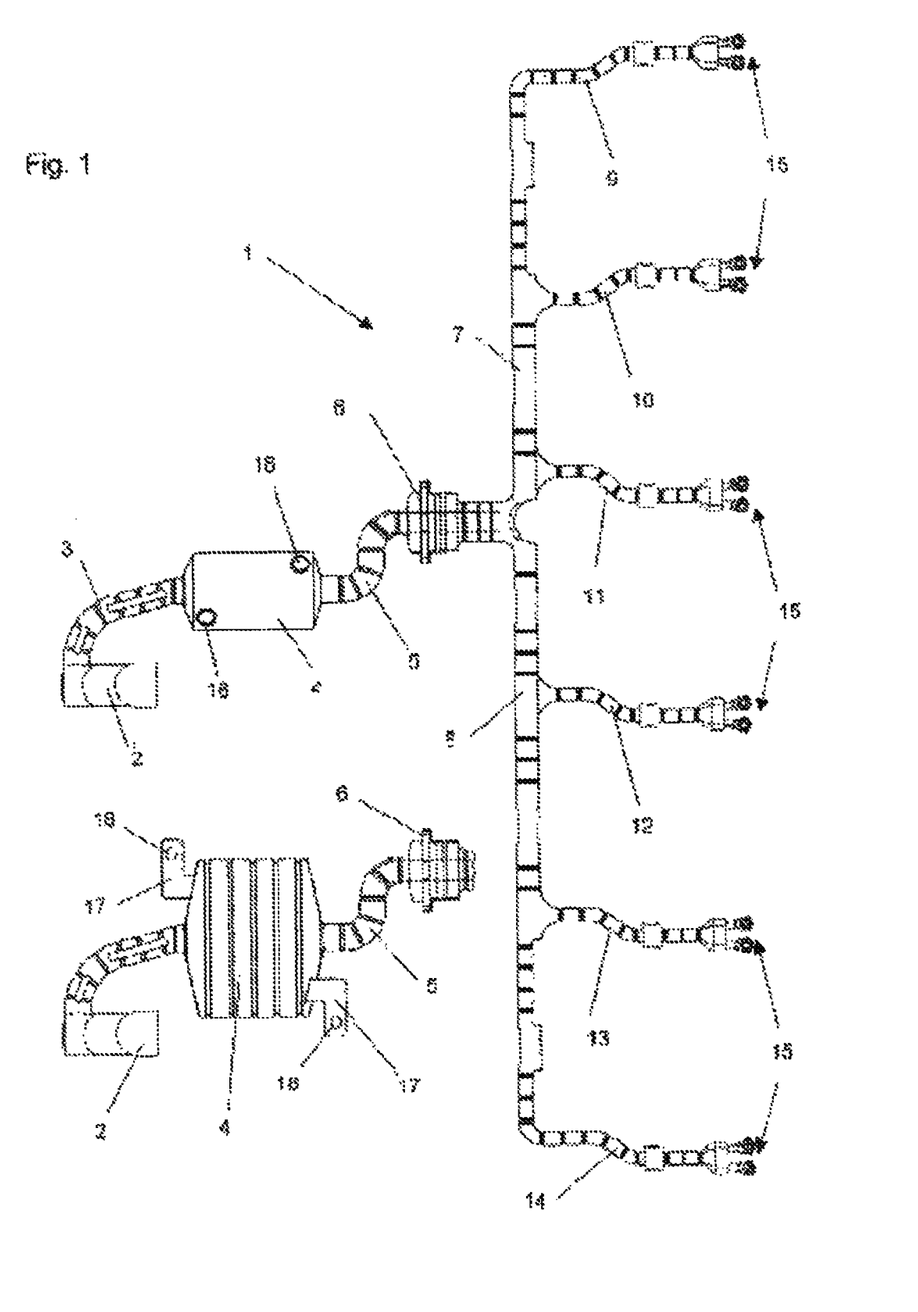
FIG. 1 shows a cable strand having a filter arrangement integrated therein.

Referring now to the drawings in detail, FIG. 1 shows a cable strand 1 that is provided at one end with a plug connector 2 for connection to an engine control device. Proceeding from the plug connector 2, the cable strand 1 leads, via a first section 3, to a filter module 4, and from there, via a second section 5, further to a lead-through flange 6. The purpose of the lead-through flange 6 is to guide the cable strand 1 through the valve cover of the internal combustion engine (not illustrated) and to seal the passageway. Following the lead-through flange 6, the cable strand 1 splits into two partial strands 7, 8, from which feed lines 9-14 branch off to the injection valves of the internal combustion engine (not illustrated). Each of the feed lines 9-14 is comprised of two lines, the ends of which are provided with connecting eyelets 15, via which, in the installed state, the lines are connected with the electrical connections of the injection valves.

The cable strand 1 is produced by molding or forming the lines and the filter module 4, with the exception of the plug connector 2 and the connecting eyelets 15, into a carrier of polymeric material, whereby the carrier on the one hand preshapes the cable strand and on the other hand has a corresponding amount of residual elasticity, thus ensuring an easy installation. Due to the fact that the cable strand 1 is exposed to the atmospheric conditions in the engine compartment, and even partially within the valve cover, the polymeric material that is used has an adequate resistance to the atmospheric conditions that exist there, especially to media such as water, dirty water, salty water, water from high pressure cleaners, cleaning fluid, fats, oils, fuels and the like, and ensures mechanical protection of the lines and components contained in the carrier. The resistance of the lines and components themselves to the media is achieved by a media-resistant insulation that directly surrounds them, and in the case of the components of the filter module 4 is achieved, for example, by a hermetically sealed lacquer coating, which will be discussed subsequently.

For the mounting of the filter module 4, through-sleeves 16 are molded therein. By means of the sleeves 16 the filter module 4, and hence the cable strand 1 that is connected with the filter module, can be secured in position relative to the plug connector 2 and to the lead-through flange 6 in a low-vibration manner.

As also shown in the lower left hand portion of FIG. 1, instead of the previously described through-sleeves, the filter module 4 can be provided with molded-in mounting pieces or straps 17 that are provided with appropriate mounting holes 18.

For the electrical connection of the filter, disposed in the filter module 4, with the ground of the engine control unit, as required with certain electrical filter circuits, the mounting sleeves 16 or the mounting pieces 17 can be electrically conductive and can be connected with the filter circuits. Further detail is provided subsequently.

With regard to the arrangement of filter module 4 relative to the engine control device, it is advantageous for the first section 3 of the cable strand 1, in other words the connecting line between the engine control device and the filter module 4, to be as short as possible. Alternatively, or in addition thereto, as a deviation of the embodiment of FIG. 1, it is possible to provide the first section 3 of the cable strand 1 with a conventional metallic shield or cladding that encases the lines and that on the one hand is connected to the ground of the engine control device and on the other hand is connected to the ground connection of the filter module.

Figure 2:
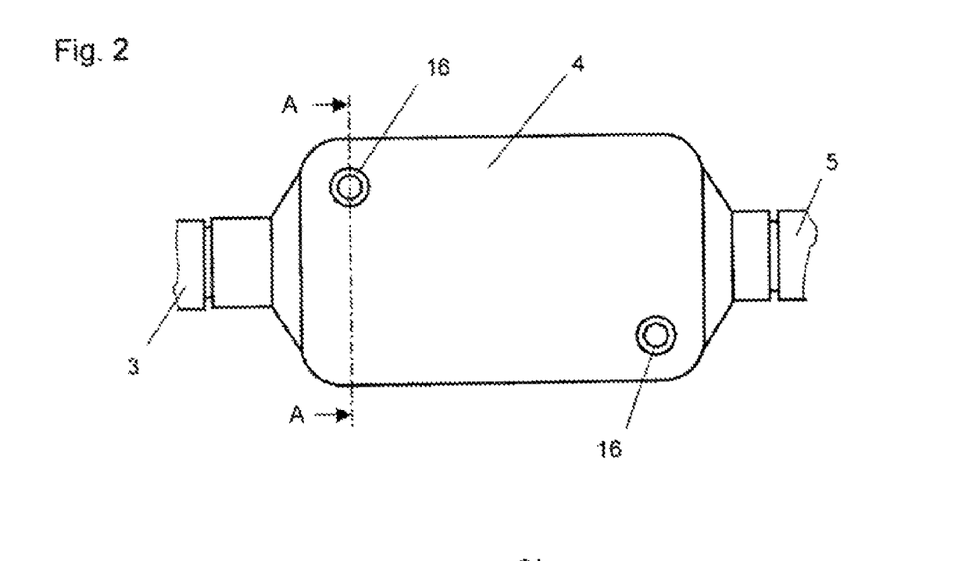
FIG. 2 shows a filter arrangement.
Figure 3:
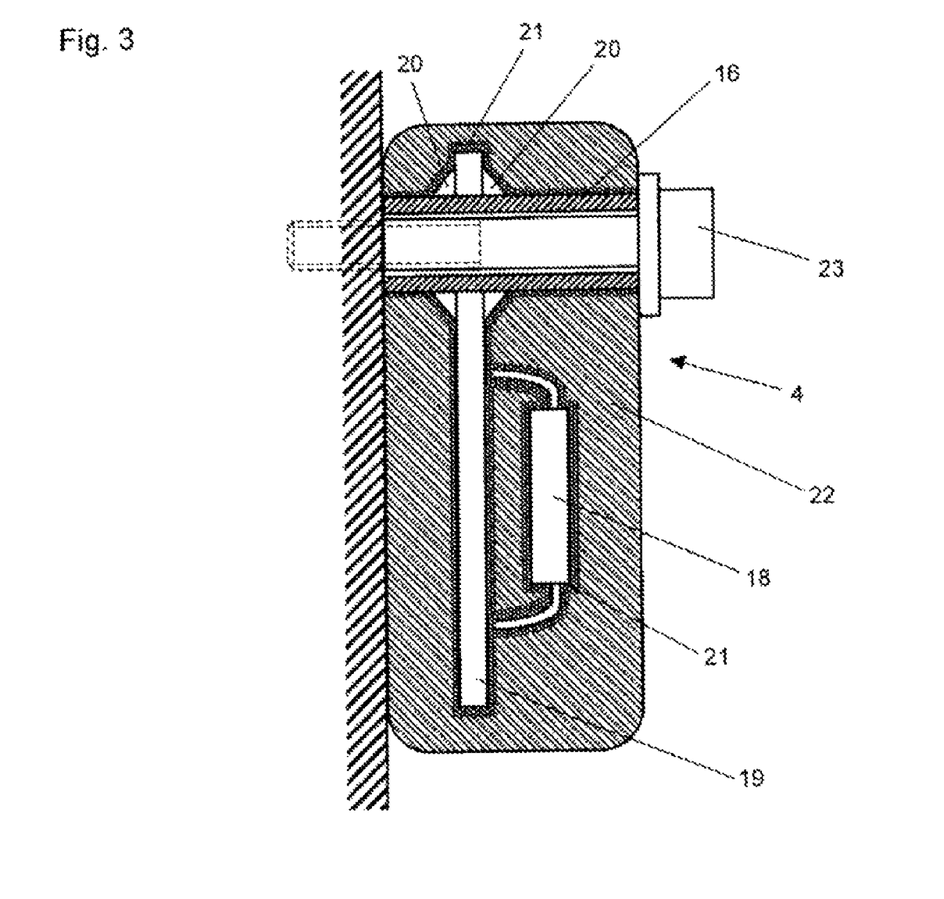
FIG. 3 is a cross-sectional view through the filter arrangement of FIG. 2 taken along the line A-A thereof.

FIG. 2 shows the filter module 4 (from the upper portion of FIG. 1) with the through-sleeves 16 disposed therein. An enlarged cross-sectional view taken along the line A-A in the arrangement of FIG. 2 is shown in FIG. 3. As can be seen from the illustration of FIG. 3, a filter support 19 in the form of a plate is provided for the electrical components 18, which form the electrical filter circuits. The through-sleeve 16 extends through the filter support 19, and these two parts are connected in an electrically conductive manner by means of a solder joint 20, The above-described arrangement is enveloped all the way around with an insulating layer 21, for example with insulating lacquer, and is molded in a casing 22 of polymeric material. To mount the filter module 4 to the internal combustion engine, or to a carrier disposed thereon, a screw 23 is provided that extends through the sleeve 16 and is anchored to the internal combustion engine or a carrier disposed thereon. In this connection, the through-sleeve 16 serves not only for the mounting, but at the same time absorbs the screw pressure and electrically connects the filter support 19 to the point at which the arrangement is mounted.

Alternatively to the arrangement shown in FIG. 3, the through-sleeve 16 can, of course, also be disposed parallel to the filter support 19 and can be soldered or welded therewith in the direction of its longitudinal axis. With reference to the illustration of FIG. 3, with this alternative arrangement imagine the filter support 19 pivoted by 90° to its longitudinal axis. Such an arrangement will be discussed in greater detail subsequently in conjunction with FIGS. 6a to 6d.

Figure 4:
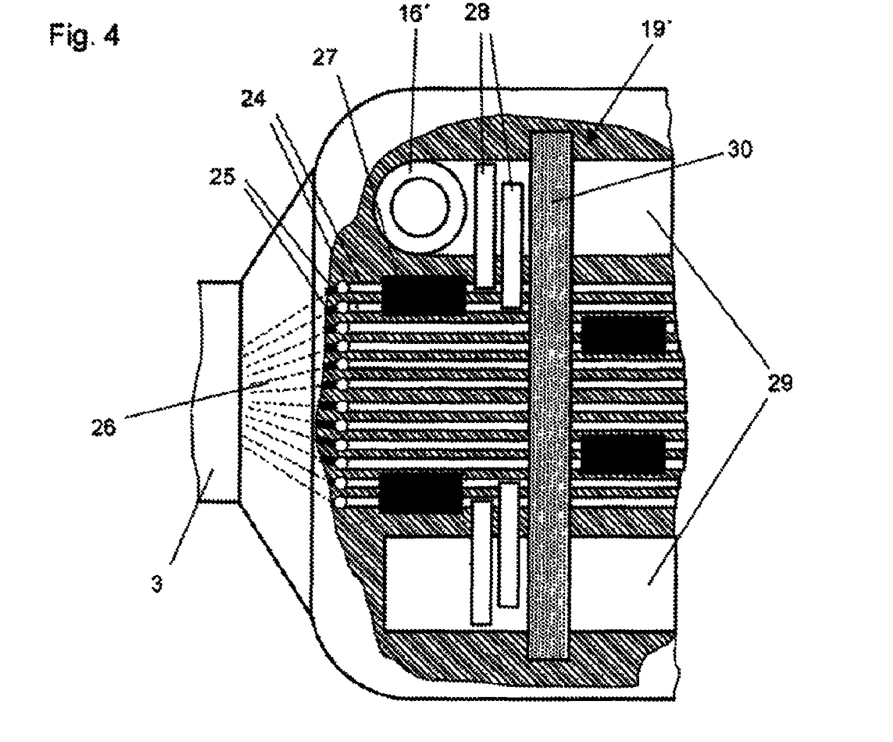
FIG. 4 is a broken-away illustration of the filter arrangement of FIG. 2.

FIG. 4 shows a further detailed illustration of the arrangement of FIG. 2. The strip conductors and components arranged in the filter module 4 are made visible in a broken-away portion. In contrast to the illustration in FIG. 3, The filter support 19' is not a plate, but rather has a metal strip structure, whereby first metal strips, which form the ground connections 29, are fixed so as to be spaced from one another by a prescribed distance via insulating holders 30. The fixation is effected in that the metal strips are either embedded in the holder 30 or are alternatively covered with polymeric material, whereby after it has cured the polymeric material forms the holder 30.

Pairs of lines or leads 25 coming from the engine control device (not illustrated) are connected to the strip conductors 24. The pairs of lines 25, in turn, are combined to form a line bundle 26 and are molded into the section 3 of the cable strand 1. A respective pair of lines 25 is provided for the activation of an injection valve (not illustrated) and is connected to two strip conductors 24 of the filter support 19', with an inductor 27 being connected in the strip conductors. After the inductor 27, the strip conductors 24 are connected via a respective capacitor 28 to a ground connection 29. The above-described arrangement of filter components exists for each conductor pair, so that there is no need to describe the further identical component arrangements shown in FIG. 4.

The ground connection 29, as part of the filter support 19', is, as with the embodiment of FIG. 3, electrically conductively connected with the through-sleeve 16', for example via a solder joint, As can be seen in FIG. 4, also with this embodiment the filter support 19', together with the components disposed thereon, is provided prior to the molding or foaming with an electrically insulating coating for example of a media-resistant insulating lacquer.

It is to be understood that as an alternative to the illustration in FIG. 4, it is also possible to embody the filter support as a printed circuit board, whereupon the strip conductors and ground connections are then etched from the copper backing of the printed circuit board.

The components used for the filter circuits can be conventional components having wire connections or can be surface mounted components.

Figure 5:
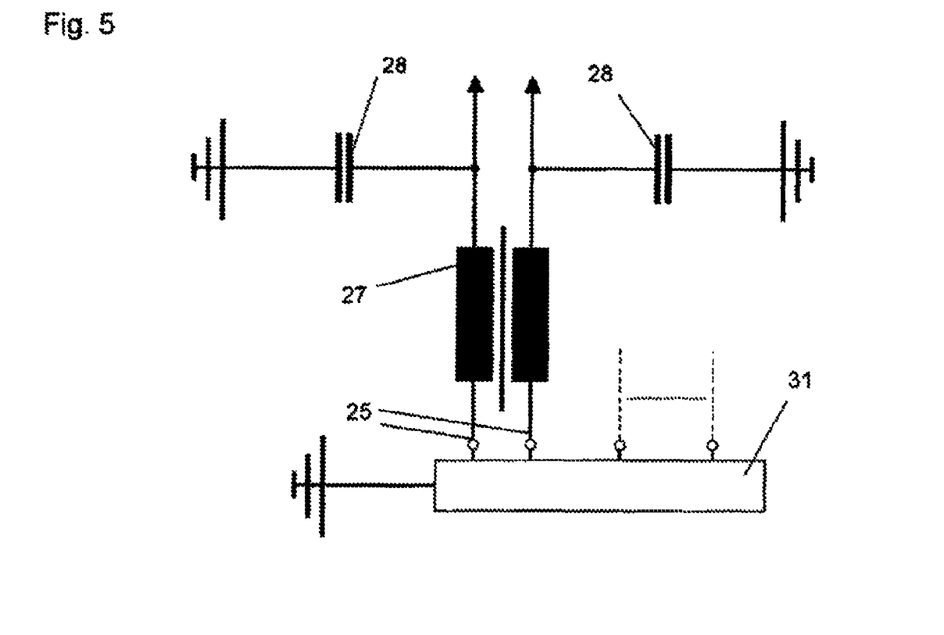
FIG. 5 is an illustration of a filter arrangement in the form of an electrical circuit diagram.

The electrical circuit diagram of a filter circuit is illustrated in FIG. 5, Respectively proceeding in pairs from an engine control device 31 are lines 25. Respectively connected in a pair of lines is an inductor 27. The two outputs of the conductor 27 are on the one hand connected with the connections of the injection valves and on the other hand are connected via a respective capacitor 28 with ground. In this case, ground means the ground of the engine control device 31.

The inductors 27 are current-compensated inductors; the design of the conductors 27 and/or the capacitors 28 is a function of the interference frequencies that are to be eliminated, the operating voltage, and the power requirement of the injection valves.

Figure 6A:
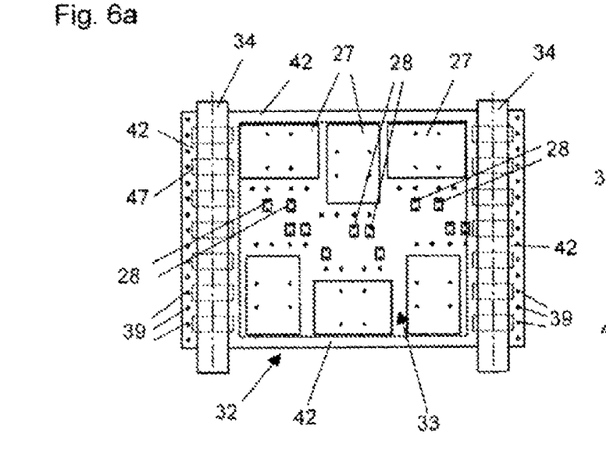
FIGS. 6a-6d are various views of a filter arrangement for a 6-cylinder internal combustion engine.
Figure 6B:
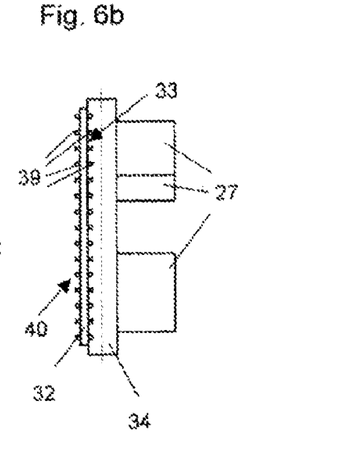
Figure 6C:
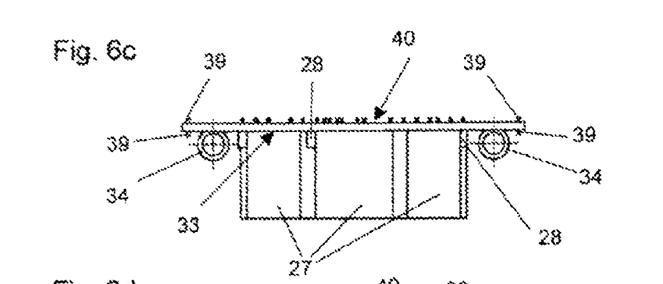
Figure 6D:
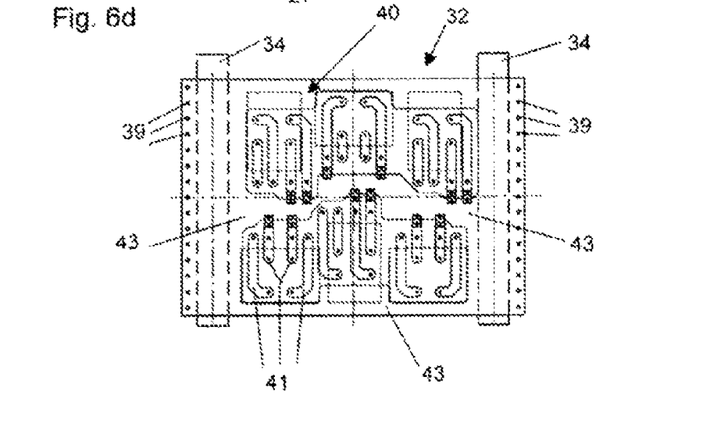
Figure 6E:
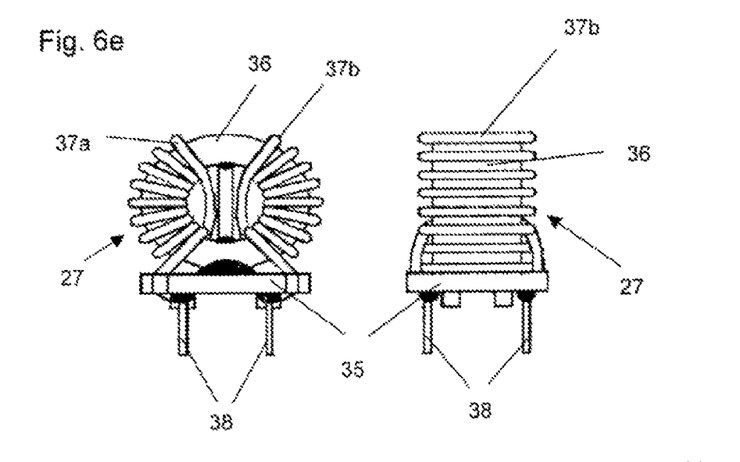
FIG. 6e shows an arrangement of two adjacent inductors.

One example for the optimized arrangement of filter circuits of the type described in conjunction with FIG. 5 on a filter support is shown in the illustrations of FIGS. 6a to 6e. The arrangement is designed for a 6-cylinder internal combustion engine, thus operating via 6 identical filter circuits, each of which is disposed in an activation line for an injection valve, and is comprised of a complete circuit. For the following description, where reference is not explicitly made to one of the figures, the FIGS. 6a to 6e, which show various views of the equipped filter support, are relied upon in combination. FIG. 6a is a view onto the equipped side, FIG. 6b and 6c each show side views, and FIG. 6d is a view onto the strip conductor side of the filter support. FIG. 6e shows the orientation of two adjacent inductors relative to one another.

The filter support shown in FIGS. 6a to 6d comprises a plate 32, on the equipped side 33 of which are disposed inductors 27, capacitors 28, and two tubular, electrically conductive mounting sleeves 34 that extend parallel to the equipped side 33, each along a narrow side of the plate 32. The plate 32 is coated on both sides with copper; on the equipped side 33, the region in which the inductors 27 and the capacitors 28 are disposed is not coated and is surrounded by a cohesive copper surface 42. The mounting sleeves 34 are soldered onto the copper coating. In order to keep the amount of heat necessary for the soldering, and the distortion of the arrangement caused by the heat, as low as possible, recesses 47 are provided in the copper coating below the mounting sleeves 34. As can be seen in FIG. 6c, on that side opposite the equipped side 33 of the plate 32 the mounting sleeves 34 are flattened: thus providing a larger contact surface.

To achieve a magnetic influence of the inductors 27 relative to one another that is as low as possible, the inductors 27 are arranged in such a way that for each two adjacent inductors 27, the axes of the magnetic fields that build up in them are disposed at an angle of about 90 degrees relative to one another. FIG. 6e shows such an arrangement of two adjacent conductors 27. The inductors, each of which comprises a carrier or support plate 35 provided with electrical leads 38, a ring-shaped core 36; and counter current windings 37a, 37b; are rotated or staggered by 90 degrees relative to one another, as a result of which reciprocal magnetic interferences that might occur are reduced to a minimum.

To minimize inductive disturbances or crossovers between lines ahead of the filter circuits, in other words of the side "contaminated" with interference signals, and lines following the filter circuits, which are also designated as "clean side", one must ensure that parallel arrangements of lines of the "clean side" with lines of the "contaminated side" are minimized, FIG. 6d shows an embodiment. The strip conductor side 40 of the plate 32 illustrated there is provided with strip conductors 41; which extend only slightly beyond the contour of the inductors 27 and capacitors 28, which are indicated by dashed lines and are disposed on the equipped side 33. Due to the fact that these strip conductors are only very short, inductive disturbances are minimized.

Large cohesive copper surfaces 43 are also disposed on the strip conductor side; these copper surfaces surround the areas having the strip conductors 41, and form the ground connection of the filter circuits. To connect these copper surfaces 43 with the copper surfaces 42 on the equipped side 33 of the plate 32, as can be seen particularly well in the view of FIG. 6b pins 39 are provided that make contact through the plate 32 in the region of the copper surfaces 42 and 43. By means of the mounting sleeves 34, which are soldered to the copper surface 42, the aforementioned copper surfaces 42 and 43 are connected to the ground of the engine control device 31, as will be described in greater detail subsequently in conjunction with FIG. 7.

Figure 7:
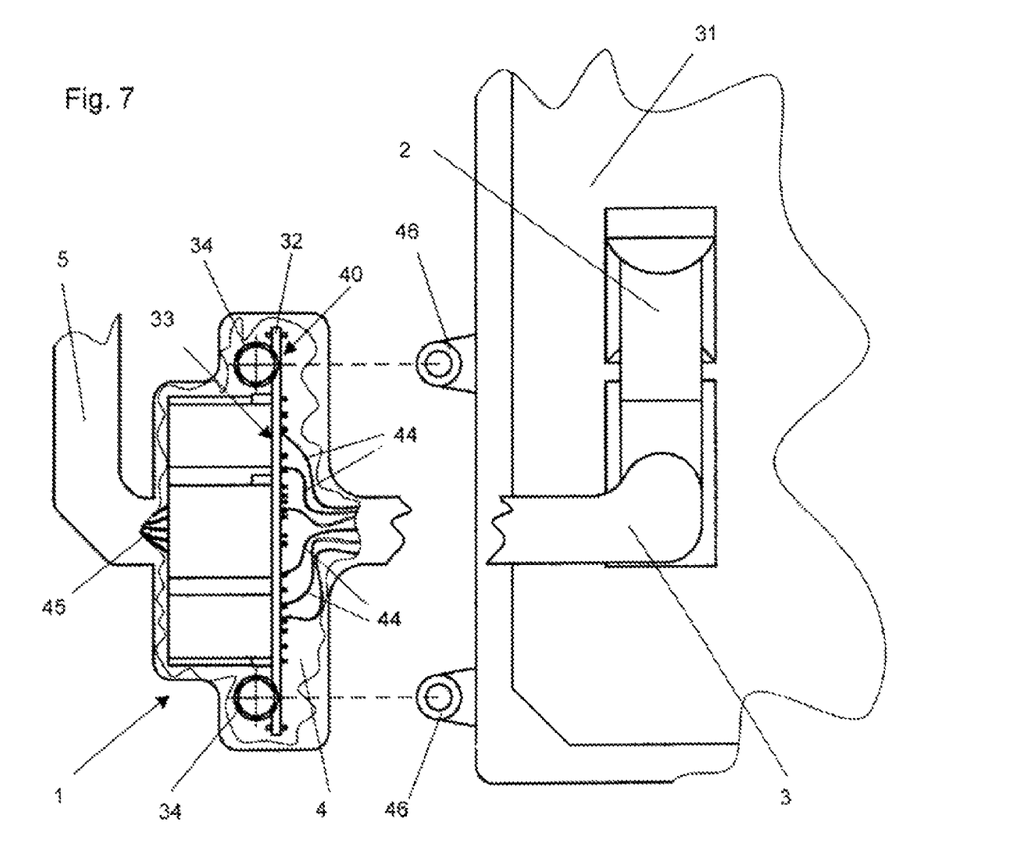
FIG. 7 shows an engine control device having a filter arrangement disposed thereon and integrated into the cable strand.

FIG. 7 shows an engine control device 31 to which the cable strand 1 is connected via the plug connector 2. The first section 3 of the cable strand 1 leads from the plug connector 2 to a first side of the filter module 4, which in a broken-away illustration shows the filter support in the view according to FIG. 6c, although rotated toward the right by 90 degrees. The strip conductor side 40 of the equipped plate 32, which forms the filter support, is disposed across from the first section 3 of the cable strand 1, so that the lines 44 that lead from the plug connector 2 to the plate 32 are connected directly to the strip conductor side 40. On that side of the filter module 4 opposite the first section 3 of the cable strand 1 the second section 5 of the cable strand 1 leads further to the injection valves, as already described in conjunction with FIG. 1. To avoid a parallel arrangement of the lines 44 with the lines 45 that lead away from the filter module 4, and thereby to minimize inductive disturbance between the side of the filter circuit that is contaminated with interference signals and the clean side following the filter circuit, the lines leading away are guided to the equipped side 33 on the plate 32 and are connected to the strip conductors via appropriate holes (not illustrated) in the plate 32.

The connection of the ground of the filter circuits with the ground of the engine control device 31 is effected in that the mounting sleeves 34, which are connected to the ground of the filter circuits, are secured to metallic mounting straps 46 of the similarly metallic housing of the engine control device 31 by means of through screws (not illustrated) that extend through the mounting sleeves 34 in a direction perpendicular to the plane of the drawing sheet. This is indicated in FIG. 7 by the dashed lines extending from the mounting sleeves 34 to the mounting straps 46.

A further measure for improving the electromagnetic compatibility of the arrangement comprised of the engine control device 31, the cable strand 1, and the filter module 4 is to design the lines leading to the filter module 4 from the engine control device 31 as well as the lines leading away from the filter module 4 to the ejection valves, as twisted pairs of lines in such a way that the direction of twist and the number of twists of pairs of lines leading to the filter module and of pairs of lines leading away from the filter module are different.

The examples described above can, of course, be embodied in various ways by one of skill in the art and still be within the scope of the present invention; the embodiments described are therefore provided by way of example only.

The specification incorporates by reference the disclosure of German priority document 10 2006 013 543.1 filed Mar. 24, 2006.

The present invention is, of course, in no way restricted to the specific disclosure of the specification and drawings, but also encompasses any modifications within the scope of the appended claims.

We claim:

1. In a cable strand for the activation of electrically actuatable injection valves of internal combustion engines having a common-rail injection system, where the cable strand connects an engine control device (31) with the injection valves, and wherein electrical cables of the cable strand are molded and/or foamed in a carrier that to a large extent prescribes the shape of the cable strand, the improvement comprising:

at least one filter also molded and/or foamed in the cable strand, wherein the at least one filter is adapted to affect the electromagnetic compatibility of the cable strand arrangement, further wherein said at least one filter comprises a plurality of filters, which are disposed on a common filter support (19, 19'), further wherein a mounting arrangement is provided on said filter support (19, 29'), further wherein said filter support is adapted to be mounted directly or indirectly on the internal combustion engine or on the engine control device (31) by means of said mounting arrangement, and wherein said mounting arrangement is embodied as either a through-sleeve (16, 16') that is adapted to be mounted directly or indirectly on the internal combustion or the engine control device (31) by means of a through screw (23), or as a strap (17) that is adapted to be mounted directly or indirectly on the internal combustion engine or the engine control device by means of a through screw.

2. The arrangement of claim 1, wherein said at least one filter comprises a plurality of filters, and wherein a respective one of said plurality of filters is associated with each feed line to an injection valve.

3. The arrangement of claim 1, wherein said common filter support (19, 19') is provided with at least one area that is electrically connected with at least one ground of each filter disposed on said filter support (19, 19').

4. The arrangement of claim 1, wherein said mounting arrangement is electrically conductive and is connected with an area of said filter support (19, 19') that has an electrically conductive connection to ground connections of filter circuits of said filters, and wherein said mounting arrangement is adapted to be connected with a ground of the engine control device (31) directly or via components of the internal combustion engine.

5. The arrangement of claim 1, which includes at least one filter support, wherein said at least one filter support (19, 19') is foamed with a polymeric material in a mechanically configuration-giving manner.

6. The arrangement of claim 1, which includes at least one filter support, wherein said at least one filter support (19, 19') is disposed in the immediate vicinity of the engine control device (31).

7. The arrangement of claim 6, wherein said at least one filter support (19, 19') is disposed on a housing of the engine control device (31).

8. The arrangement of claim 1, which includes at least one filter support (19, 19'), wherein components that form said at least one filter are disposed on said at least one filter support in such a way as to minimize an electromagnetic coupling between them.

9. The arrangement of claim 1, which includes at least one filter support (19,19'), wherein lines that lead to said at least one filter support and lines that lead away from said at least one filter support do not extend next to one another.

10. In a cable strand for the activation of electrically actuatable injection valves of internal combustion engines having a common-rail injection system, where the cable strand connects an engine control device (31) with the injection valves, and wherein electrical cables of the cable strand are molded and/or foamed in a carrier that to a large extent prescribes the shape of the cable strand, the improvement comprising:

at least one filter also molded and/or foamed in the cable strand, wherein the at least one filter is adapted to affect the electromagnetic compatibility of the cable strand arrangement; and at least one filter support (19, 19'), wherein said at least one filter and said at least one filter support are provided with an electrically insulating sheathing (21) prior to the molding and/or foaming, and wherein said sheathing encases the at least one filter support (19, 19') and components disposed thereon in a media-impervious manner.

11. The arrangement of claim 10, wherein said encased at least one filter support (19, 19'), with the components disposed thereon, is molded with a sealing compound or filler such that the components are supported relative to one another and relative to said at least one filter support (19, 19') in a low-vibration manner.

12. In a cable strand for the activation of electrically actuatable injection valves of internal combustion engines having a common-rail injection system, where the cable strand connects an engine control device (31) with the injection valves, and wherein electrical cables of the cable strand are molded and/or foamed in a carrier that to a large extent prescribes the shape of the cable strand, the improvement comprising:

at least one filter also molded and/or foamed in the cable strand, wherein the at least one filter is adapted to affect the electromagnetic compatibility of the cable strand arrangement; and at least one filter support (19, 19'), wherein lines that lead to said at least one filter support, and lines that lead away from said at least one filter support, are pairs of twisted lines, and wherein a direction of twist and a number of twists of pairs of lines that lead to said at least one filter support and of pairs of lines that lead away from said at least one filter support differ from one another.

* * * * *